United States Patent
Gagne et al.

(10) Patent No.: US 7,798,411 B2
(45) Date of Patent: *Sep. 21, 2010

(54) HEATED PROTECTIVE WINDOW FOR AN OPTICAL SCANNING DEVICE

(75) Inventors: Andre Joseph Claude Gagne, Brampton (CA); Daniel Joseph Meringer, Burlington (CA); Virgil Nastase, Mississauga (CA)

(73) Assignee: Psion Teklogix Inc., Mississauga, ON (CA)

( * ) Notice: Subject to any disclaimer, the term of this patent is extended or adjusted under 35 U.S.C. 154(b) by 658 days.

This patent is subject to a terminal disclaimer.

(21) Appl. No.: 11/447,888

(22) Filed: Jun. 7, 2006

(65) Prior Publication Data

US 2006/0226228 A1   Oct. 12, 2006

Related U.S. Application Data

(63) Continuation-in-part of application No. 10/421,936, filed on Apr. 24, 2003, now Pat. No. 7,059,530.

(51) Int. Cl.
*G06K 7/10* (2006.01)
(52) U.S. Cl. .............. 235/462.45; 235/462.01; 235/472.01
(58) Field of Classification Search .......... 235/454, 235/462.01, 462.45, 472.01
See application file for complete search history.

(56) References Cited

U.S. PATENT DOCUMENTS

| 3,789,192 | A | * | 1/1974 | Spindler | 219/522 |
|---|---|---|---|---|---|
| 4,791,426 | A | * | 12/1988 | Lindenmeier et al. | 343/713 |
| 4,857,711 | A | * | 8/1989 | Watts | 219/548 |
| 5,173,586 | A | * | 12/1992 | Gold | 219/203 |
| 5,307,076 | A | * | 4/1994 | Murakami et al. | 343/704 |
| 5,508,505 | A | | 4/1996 | Walts et al. | |
| 5,729,003 | A | | 3/1998 | Briggs | |
| 5,804,817 | A | * | 9/1998 | Seiler et al. | 250/227.25 |
| 6,236,419 | B1 | * | 5/2001 | Kim | 347/138 |
| 6,321,990 | B1 | | 11/2001 | Giodano et al. | |
| 6,483,078 | B2 | * | 11/2002 | Sullivan | 219/209 |
| 6,612,493 | B1 | | 9/2003 | DeGiovine et al. | |
| 7,059,530 | B2 | | 6/2006 | Gagne et al. | |
| 2002/0011477 | A1 | * | 1/2002 | Jones et al. | 219/219 |
| 2002/0060247 | A1 | | 5/2002 | Krishnaswamy | |

\* cited by examiner

*Primary Examiner*—Thien Minh Le
*Assistant Examiner*—April A Taylor (57) ABSTRACT

The invention relates to a window for an optical scanning device comprising a panel having a pair of oppositely directed light transmitting surfaces. A PTC heater wire preferably of a diameter less than the width of the smallest permissible indicia of a barcode is used to regulate the temperature of the panel. A conductive layer comprising carbon nanotubes is also provided for regulating the temperature of the device window. A window intrinsically comprising carbon nanotubes is also provided.

12 Claims, 5 Drawing Sheets

HEATED PROTECTIVE WINDOW FOR AN OPTICAL SCANNING DEVICE

This application is a continuation-in-part of U.S. patent application Ser. No. 10/421,936 filed Apr. 24, 2003 now U.S. Pat. No. 7,059,530.

The present invention relates to a protective window for use on an optical scanning device.

BACKGROUND OF THE INVENTION

Various optical scanning devices, such as, for example, 2-D scanners or imaging scanners, have been developed for reading barcode symbols appearing on a label or the surface of an article. The barcode symbol itself is a coded pattern of indicia comprised of a series of bars of various widths spaced apart from one another to bound spaces of various widths. The bars and spaces have different light-reflecting characteristics and the barcode is read by projecting light, such as that from a laser beam, onto the barcode. The information content of the bar code is retrieved by monitoring the reflected beam and converting modulation in the reflected light in to a signal corresponding to the symbols.

Typically, the scanner has a body to house the components and a window to permit transmission of the beam from the laser and receive the reflected portion of the beam, The accuracy and range of the scanning device depends in part on the quality of the transmission through the window and any obstruction will lead to a degradation in performance.

Many optical scanning devices are mobile for use in warehousing and similar environments where a variety of environmental conditions can exist in a short span of time. For example, a hand-held barcode reader may be used to inventory goods located in a freezer. To avoid undue exposure of the operator to low temperatures, the frozen goods are withdrawn from the freezer and inventoried outside the freezer. When the hand-held barcode reader is taken in to a cold environment, the temperature of it's components drops below the dew point and, upon return to room temperature, condensation builds up on either or both sides of the barcode reader's window. The condensation completely or partially obscures the window and thus reduces the effectiveness of the barcode reader until the condensation dissipates. This leads to either inaccuracy of the reading or a reduction in the efficiency of the inventory taking.

Accordingly, it is an object of the present application to obviate or mitigate the above disadvantages.

SUMMARY OF THE INVENTION

The present invention seeks to provide a solution to the problem of having condensation building up on either or both sides of a window for an optical scanner when used in a condensing environment.

In one aspect, there is provided a window assembly for an optical scanning device comprising a light transmitting panel having a pair of oppositely directed planar surfaces parallel to one another to receive and transmit a scanning beam; and a positive temperature coefficient (PTC) heater wire in contact with said panel, said heater wire being arranged within a perimeter of said panel and having terminal portions for connection to a power source.

In another aspect, there is provided an optical scanning device having a housing; and a window assembly to transmit a beam between an interior of said housing and a barcode formed from a plurality of indicia, said window assembly comprising a light transmitting panel having a pair of oppositely directed planar surfaces parallel to one another to receive and transmit a scanning beam; a positive temperature coefficient (PTC) heater wire in contact with said panel, said heater wire being arranged within a perimeter of said panel and having terminal portions for connection to a power source; and a switch operable to connect said power source to said heater wire.

In yet another aspect, there is provided a method of forming a window for a scanner assembly comprising arranging a positive temperature coefficient (PTC) heating wire in contact with a light transmitting panel having a pair of oppositely directed planar surfaces parallel to one another to receive and transmit a scanning beam; and arranging said heating wire to maintain contact with said panel.

In yet another aspect, there is provided a window assembly for an optical scanner comprising a light transmitting panel having a pair of oppositely directed planar surfaces parallel to one another to receive and transmit a scanning beam, said window assembly comprising an electrically conductive material arranged to be in contact with said panel whereby connection of a power source to a pair of contacts connected to said electrically conductive material raises the temperature of said panel above a predetermined value.

An embodiment of the invention will now be described by way of example only with reference to the appended drawings wherein:

DETAILED DESCRIPTION OF THE INVENTION

Figure 1:
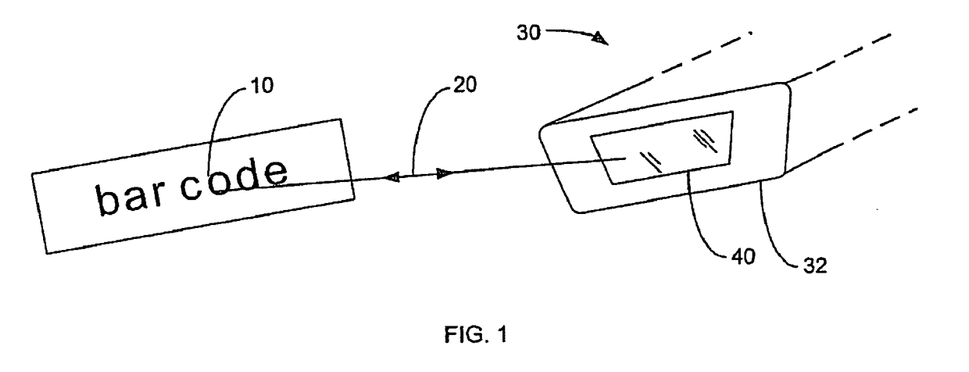
FIG. 1 is a perspective view of a hand-held barcode reader aimed at a barcode symbol.
Figure 2:
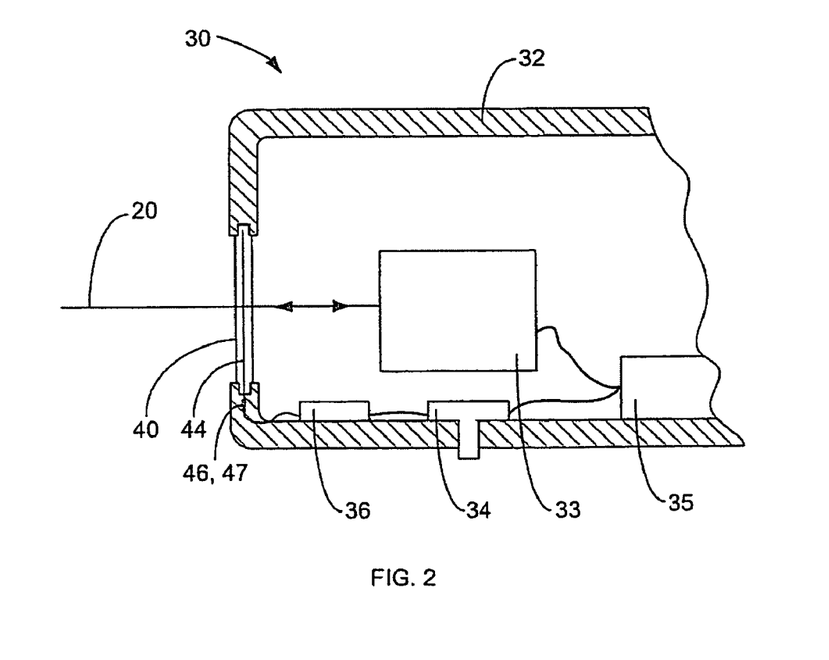
FIG. 2 is a sectional view of a portion of the hand-held barcode reader of FIG. 1.

Referring to the drawings, and particularly to FIGS. 1 and 2, there is shown an optical scanning device in the form of a hand-held barcode reader 30, including an external housing 32 having a window assembly 40 at one end. The housing 32 is arranged to be held in the palm of a user's hand and contains the components 33 for generating a laser beam 20 to be projected through the window assembly 40 and reading a reflected portion of the beam 20 received through the window assembly 40. A power source 35 is located within the housing 32 to supply electrical power to the components 33 of the barcode reader 30.

The barcode reader 30 is oriented in the direction of a barcode or other symbol 10 to be read. The outgoing beam 20 is generated in the barcode reader 30 by a laser diode or the like, is directed through barcode reader window assembly 40 to impinge upon the barcode 10. The range of the reader 30 may accommodate barcodes 10 that ordinarily are positioned of from just a few centimeters up to 18 or more meters from the barcode reader 30. The barcode 10 is formed from a concatenation of indicia of a predetermined minimum width to provide a binary modulation to the beam 20 as it is scanned and the reflected beam read to recover the code.

As mentioned previously, the hand-held barcode reader 30 may be used to inventory goods under conditions that may result in condensation developing on either or both sides of the barcode reader window 40. To avoid the formation of condensation, the temperature of the barcode reader window 40 is controlled. Accordingly, the barcode reader window 40 may either be kept at a temperature above the dew point, which prevents the build up of condensation on either of its sides or, alternatively, its temperature may be raised at any time, which clears the built up condensation. This is accomplished by incorporating a heating element within the window 40 that is connected to the power source 35 so as to provide a temperature adjustment mechanism.

Figure 3:
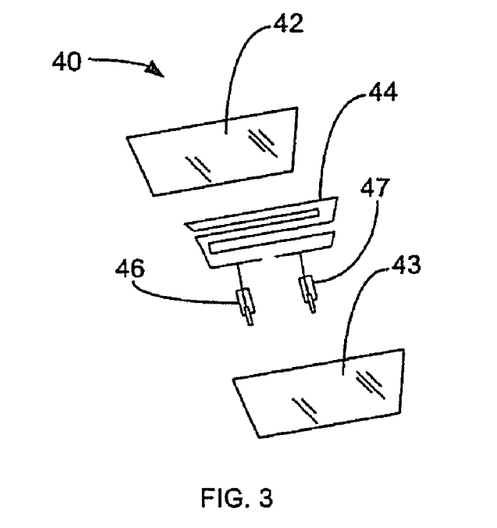
FIG. 3 is an exploded view of a window of the barcode reader of FIG. 1.
Figure 4:
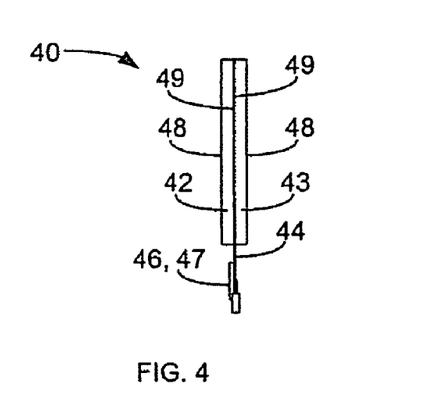
FIG. 4 is a side view of the barcode reader window of FIG. 3.
Figure 5:
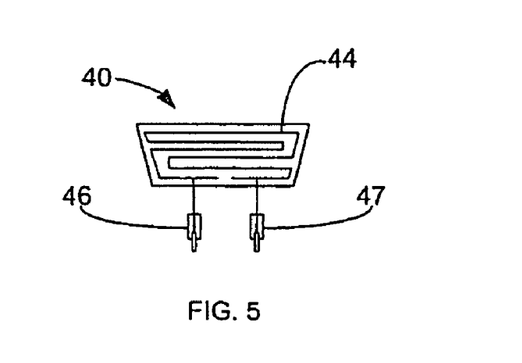
FIG. 5 is a front view of the barcode reader window of FIG. 3.

As best seen in FIGS. 3, 4 and 5 window assembly 40 comprises a first and second light transmitting elements 42 and 43 between which is sandwiched a heater wire 44 terminating into a pair of contacts 46 and 47. Each element has a pair of oppositely directed surfaces 48, 49 that present a pair of substantially planar surfaces to the beam 20.

In a particular embodiment, the barcode reader window 40 is made of cast red acrylic sheets with spectral transmission characteristics as described in Table 1 and is intended for use in laser barcode readers operating, preferably, in the 675 nm wavelength range. The overall thickness of the elements 42 and 43, in the particular embodiment, is 1.5 mm (0.059 inch)±0.15 mm (0.006 inch). It should be noted that barcode reader windows 40, with different characteristics, material and dimensions, may be substituted depending on, for example, the wavelength of the laser diode used.

TABLE 1

Spectral Transmission

| Wavelength | Transmission |
|---|---|
| 450 to 575 nm | 1% maximum |
| 576 to 600 nm | 10% maximum |
| 625 nm | 50% typical |
| 670 to 700 nm | 88% minimum |

In order to avoid the misinterpretation of the heater wire's 44 shadow as being part of the barcode 10, the heater wire 44 preferably has a dimension measured in the plane of the surfaces 48, 49 which is inferior to the precision of the optical reader. Typically, the smallest permissible width of an indicia composing a barcode is about 0.13 mm (0.005 inch), therefore the heater wire's 44 diameter should be inferior to 0.13 mm (0.005 inch) and preferably less than 50% of the width. It is preferred that the width is less than 20% and in a particular embodiment, the heater wire 44 has a diameter of 0.0229 mm (0.0009 inch), i.e. approximately 18% of the width of the indicia of the bar code, i.e. less than 20%. It should be noted that the size of the smallest bar composing a barcode varies depending on the type of reader used and thus the maximum acceptable diameter for the heater wire 44 will vary accordingly, i.e. be proportionately bigger or smaller.

In order to maintain the required performance of the window it is preferred that the heater wire 44 is arranged in a serpentine pattern with the runs of wire extending normal to axis of the indicia of the bar code and the reversals at the periphery of the window. Such an arrangement minimizes the obstruction to the beam 20 during transmission and reflection. If the heater wire 44 is laid out perpendicular to the beam, i.e. parallel to the bars in the barcode 10, then the reader may view it as being part of the barcode 10. The presence of the heater wire 44 in the beam's 20 path, will inevitably cause some power loss which will result in scanning range loss. However by minimizing the diameter and maintaining it less than the width of the smallest permissible indicia of the barcode, the losses are maintained in acceptable levels.

It should be noted that the heater wire may be of any electrically conductive material, it may also be any electrically conductive trace material forming a path from one terminal to the other. In this case, the width of the trace, i.e. the dimension in the plane of the surfaces, will conform to the parameters noted above.

In a particular embodiment, the heated barcode reader window 40 is assembled by laying out the heater wire 44 in the desired pattern onto a Pressure-Sensitive Adhesive (PSA) lined optically clear polyester sheet. The polyester sheet is of the same dimensions as the light transmitting panels 42 and 43, and the heater wire 44 is laid out on it so that its extremities protrude from the perimeter of the sheet. Preferably, the run of the heater wire 44 is transverse to the orientation of the bars of the barcode 10 and is of serpentine pattern with the reversals at the marginal portions of the barcode reader window 40. The extremities of the heater wire 44 terminate into contacts 46 and 47, such as, for example, gold plated contacts with 30 awg wire, which serve to connect the heater wire 44 to a power source and a control circuit. The polyester sheet is then applied onto one of the light transmitting panel's 42 surface. Following that, a PSA material is applied onto the polyester sheet. Finally, the remaining light transmitting panel 43 is placed on top of the partial assembly such that the heater wire 44 and polyester sheet are sandwiched between both light transmitting panels 42 and 43. To complete the assembly process, the light transmitting panels 42 and 43 are compressed together at a pressure higher than the PSA's compression setting. All of this process is preferably done under vacuum in order to reduce adhesive distortion in the barcode reader window 40 caused by air entrapment. It is important to note that the surfaces 48, 49 of the light transmitting panels 42 and 43 need to be parallel to each other to ensure proper reflection and refraction angles. In an alternate embodiment, the heater wire 44 may be embedded within a light transmitting panel and/or may be laid out in other configurations such as, for example, circular or sinusoidal patterns.

After mounting the window assembly 40 in the housing 32, the contacts 46, 47 are connected to the power source 35 through a suitable switching device 34 to control the power to the heater wire 44. The heater wire 44 of the window assembly 40 may be activated manually by the user through a switch 34 accessible to the user to remove any condensation that may have built up. Preferably however the heater wire 44 is connected, using contacts 46 and 47, to a thermostat 36 such as, for example, the LM56 Dual Output Low Power Thermostat by National Semiconductor, for keeping the barcode reader window 40 above a minimum temperature, preferably above the dew point. The thermostat 36 is mounted within the housing 32 preferably on an exterior surface so that it is responsive to external temperature fluctuations.

Alternately, the thermostat 36 may use, for example, an RTD (Resistance Temperature Detector) temperature sensor, a thermocouple based sensor, another temperature transducer or the heater wire itself, in case of using a wire with electrical characteristics suitable for this purpose. For example, a PTC (Positive Temperature Coefficient) resistance wire for a constant voltage power mode or NTC (Negative Temperature Coefficient) resistance for a constant current power mode can be used. Thus during use the heater wire 44 is activated when the external temperature is below the setting of the thermostat 36. The current supplied to the wire 44 ensures that the window 40 is maintained at an elevated temperature so that upon the barcode reader 30 being moved to a condensing environment, the window 40 is above the dew point and condensation does not form.

Figure 6:
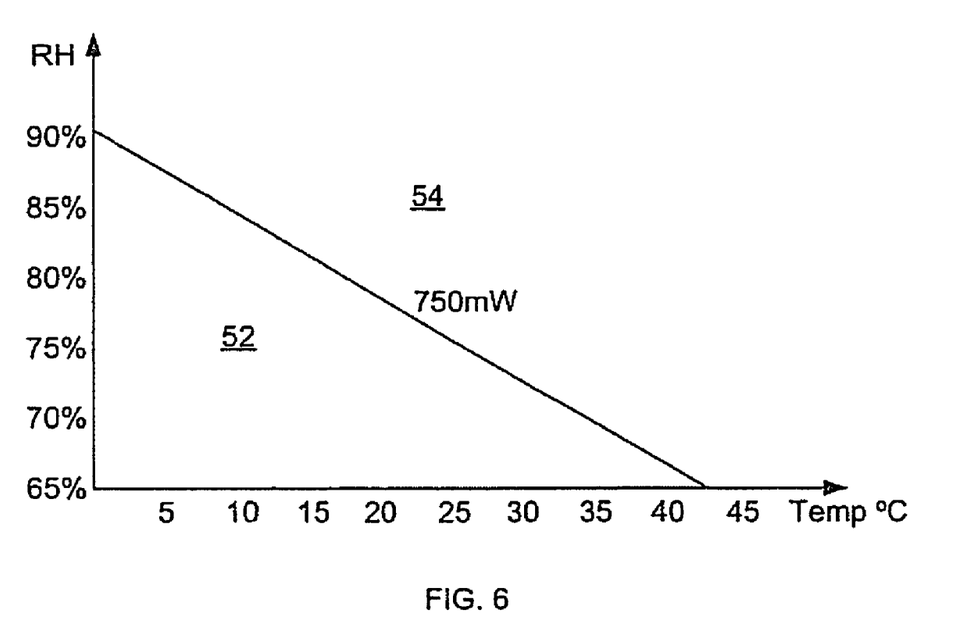
FIG. 6 is a histogram of the appearance of condensation as a function of the relative humidity level and temperature for a particular embodiment.

In the particular embodiment, the size of the heated barcode reader window 40, which is made of cast red acrylic sheets, is approximately 34.9 mm (1.374 inch) by 16.1 mm (0.634 inch) and has a power consumption above 750 mW. It should be noted that the power consumption of the particular embodiment is based on a window made of cast red acrylic sheets, other material may be substituted, such as glass or Pyrex©, in which case the power consumption requirement will vary according to the thermal characteristics of the material used. FIG. 6 illustrates the histogram, for the particular embodiment, of the appearance of condensation impairing the hand-held barcode reader's 30 operation as a function of the relative humidity (RH) and ambient temperature when the barcode reader 30 is taken from an environment having a temperature of −30° C. The numeral 52 represents the region where there is no condensation or where the condensation is light enough so as not to interfere with the hand-held barcode reader's 40 operation, while numeral 54 indicates the region where the condensation renders the barcode reader 30 nonfunctional.

Other embodiments having windows of different size and/or material and power requirements are possible. Similarly, the heater wire 44 may be embedded within the window assembly 40 by techniques other than lamination, such as being cast in situ so as to be below the surfaces 48, 49.

Figure 7:
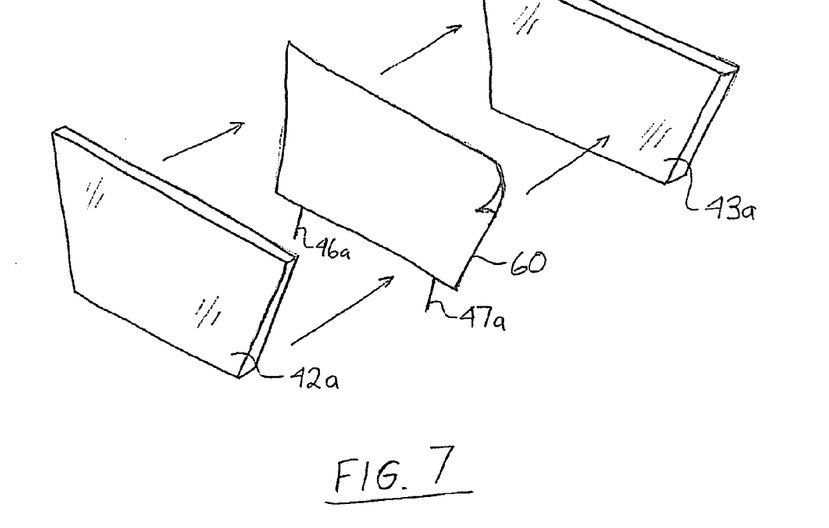
FIG. 7 is an exploded view of another embodiment of the window of the barcode reader of FIG. 1.

In another embodiment, shown in FIG. 7, a conductive material such as a conductive layer 60 (e.g. coating or film) is used to raise the temperature of the window 40. Preferably, the conductive material comprises carbon nanotubes. In FIG. 7, the layer 60 is made with carbon nanotubes inserted in a planar film. The layer 60 may be applied to either side of the window 40. However, in most circumstances, application of the layer 60 to the outer surface is less ideal due to the potential safety risk associated with having an exposed, relatively hot surface.

A preferred arrangement is shown in FIG. 7, wherein the layer 60 is sandwiched between an outer panel 42a and an inner panel 43a. The layer 60 includes a pair of protruding contacts 46a, 47a for generating an electric current through the layer 60 to regulate the temperature of the window 40, similar to the arrangement shown in FIG. 2.

Carbon nanotubes, also known as buckeytubes, are cylindrical carbon molecules with unique electrical properties and are efficient conductors of heat, which make them particularly useful in defrosting and/or minimizing dew on a barcode reader window 40. The diameter of a carbon nanotubes is on the order of a few nanometers and are typically several micrometers in length. Accordingly, the carbon nanotubes do not interfere with the optical transparency of the window 40.

There are two main types of nanotubes, namely single-walled nanotubes (SWNT) and multi-walled nanotubes (MWNT) of which the single-walled variety are most applicable to the embodiment of FIG. 7. The structure of a SWNT can be visualized as a seamless cylinder formed from a one-atom-thick layer of graphite called graphene. SWNTs have been shown to be proficient electrical conductors, e.g., as discussed in DEKKER, C., "*Carbon Nanotubes as Molecular Quantum Wires*", Phys. Today, 1999, May, 22-28.

The layer 60, as a result of having the carbon nanotubes embedded therein, is electrically conductive, and thus the contacts 46a, 47a can be connected to the power source 35 as described above to raise the temperature of the layer 60 and consequently control the temperature of the window 40.

In another embodiment (not shown) the window 40 can be made of an intrinsically electrically conductive material that is also optically transparent. Such a material may be manufactured from a base material such as glass or a suitable polymer with a controlled amount of carbon nanotubes or similar nanocompounds (e.g. buckeyballs). Such nanocompounds will create the necessary electrical conductivity of the window such that the window temperature can be controlled using an appropriate pair of contacts. The addition of electrically conductive nanomaterials is done such that the optical requirements and properties of the base material are not significantly changed.

In certain applications employing a resistive heater wire 44 such as that described with respect to FIG. 1., it has been observed that under certain conditions, the temperature of the wire 44 rises above the boiling point for glue (or similar adhesive) surrounding the wire 44 that is used to bond the panels 42, 43 together. Such conditions may vary depending on the power source 35, the thickness of the wire 44 and the boiling point of the glue. As a result defects such as bubbles between the panels 42, 43, mechanical stress on the interface of the panels 42, 43, voids between the panels 42, 43, and wire displacement may occur. Such defects can degrade the optical properties of the window assembly 40.

Figures 8, 9:
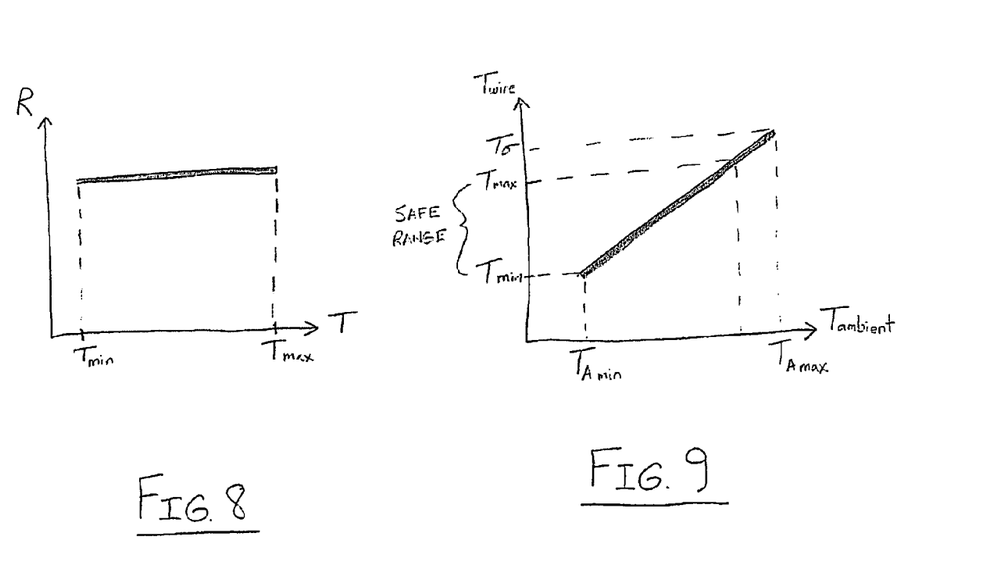
FIG. 8 is a graph illustrating resistance versus temperature for a constant resistivity heating element.
FIG. 9 is a graph illustrating wire temperature versus ambient temperature for a constant resistivity heating element.

The relationship between resistance and temperature for a constant resistivity wire is shown in FIG. 8. Consequently, as shown in FIG. 9, the ambient temperature surrounding the wire 44 increases linearly with a corresponding increase in wire temperature. Typically there is a "safe range" of temperatures for the wire before the ambient temperature becomes too high resulting in the defects discussed above.

Figures 10, 11:
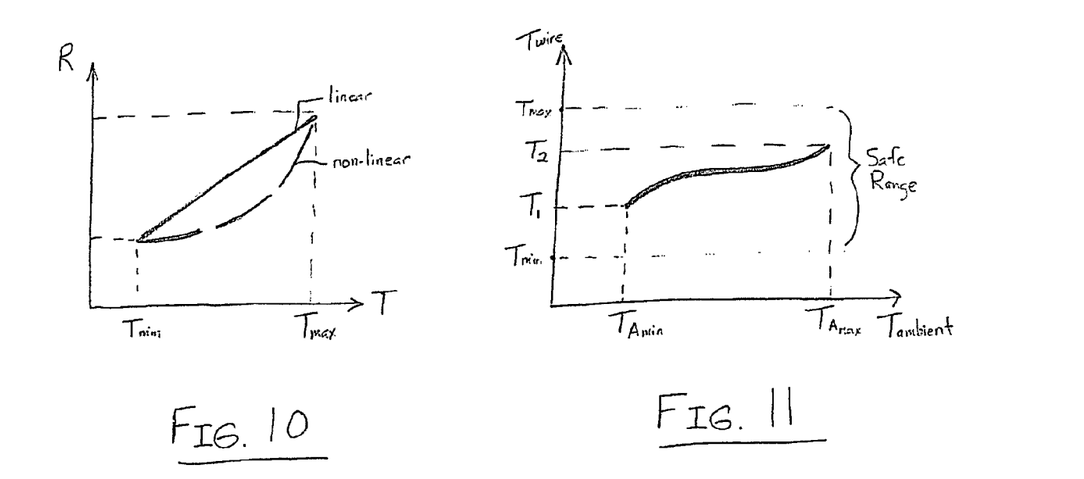
FIG. 10 is a graph illustrating resistance versus temperature for a positive temperature coefficient resistivity heating element powered under a constant voltage.
FIG. 11 is a graph illustrating wire temperature versus ambient temperature for a positive temperature coefficient resistivity heating element.

To avoid the above defects, a positive temperature coefficient (PTC) wire can be used instead of a constant resistivity wire to self-regulate the heating of the wire 44. The relationship between resistance and temperature for a PTC wire is shown in FIG. 10. As illustrated in FIG. 10, as the temperature of the wire increases, the resistance also increases, and the relationship may be either linear or non-linear. As a result of such relationship, as the temperature rises, the increased resistance causes less current to flow through the wire which inhibits overheating of the wire. The relationship between wire temperature and ambient temperature is shown in FIG. 11 for a PTC wire.

Figure 12:
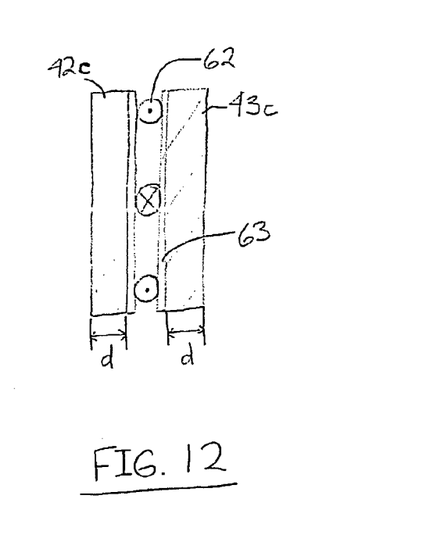
FIG. 12 is a sectional view of another embodiment of the window of the barcode reader of FIG. 1 employing a heating element according to the graphs of FIGS. 10-11.
Figure 13:
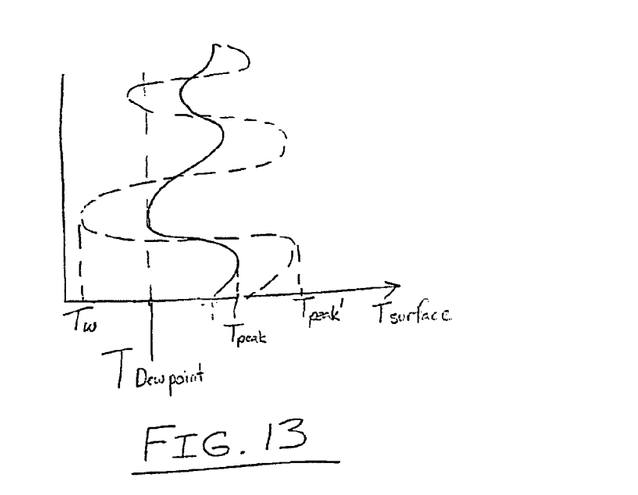
FIG. 13 is a graph illustrating surface temperature for different window thicknesses at corresponding wire locations of the window of FIG. 12.

In yet another embodiment shown in FIG. 12, a PTC wire 62 is sandwiched between an outer panel 42c and an inner panel 43c and the panels 42c and 43c are bonded together using a suitable adhesive 63. As shown in the graph of FIG. 13, the surface temperature of the panels 42c, 43c will vary based on their thicknesses "d". In FIG. 13, the dashed line represents a value d that is relatively smaller than the d for the solid line. The minimum temperature needed to remove condensation from the window 40 is indicated in the figure as $T_{Dewpoint}$. As seen in FIG. 13, the surface temperature varies along the window surface depending upon the relative position of the wire 62. Accordingly, the peak temperature occurs in regions that contact the wire 62 and the temperature decreases as the distance from the wire increases, the minimum being approximately half-way between successive passes of the wire 62.

As can also be seen from FIG. 13, the smaller the thickness d, the larger is the variation in surface temperature, in which case, the minimum dewpoint temperature may not be achieved. The optimum value for d varies with the quality of the material used for the panels 42c, 43c, the ambient temperature range (based on the PTC material) and the input power. These characteristics should be chosen to achieve a behavior that resembles the solid line shown in FIG. 13 such that the window 40 is free of condensation along its entire surface.

It has been found that by choosing d to be 1 mm, using a cast acrylic material with a diameter of 0.0009 inches, a Temperature Coefficient of Resistance (TCR) of 0.0067 and a specific resistivity of 55.57 ohm/ft, the embodiment is suitable for removing condensation while operating in an ambient temperature range of −30 to +60 deg C. It will be appreciated that the PTC wire 62 is preferably arranged in a manner similar to the wire shown in FIG. 5.

It will be appreciated that the PTC wire 62 may instead be embedded within a single-paneled window (not shown) or bonded to one side of such single-paneled window and shall not be limited to the arrangement shown in FIG. 12. It will also be appreciated that the above principles with respect to the wire 44 similarly apply to use of the PTC wire 62 along with similar design considerations as discussed above.

Although the present invention has been described by way of a particular embodiment thereof, it should be noted that modifications may be applied to the present particular embodiment without departing from the scope of the present invention and remain within the scope of the appended claims.

The invention claimed is:

1. A window assembly for an optical scanner comprising:
   a) a light transmitting panel having a pair of oppositely directed planar surfaces parallel to one another to receive and transmit a scanning beam, said pair of oppositely directed planar surfaces being bonded together using an adhesive; and
   b) a positive temperature coefficient (PTC) heater wire in contact with said panel said positive temperature coefficient heater wire being arranged between said panels and having terminal portions for connection to a power source,
   the panel having a thickness that is determined in dependence upon the material of said panel, an ambient temperature range based on said positive temperature coefficient heater wire and an input power of said power source, so that a temperature of said positive temperature coefficient heater wire is below a boiling point of said adhesive and a temperature of said panel is above a minimum dewpoint temperature.

2. A window assembly according to claim 1, wherein said panel is formed from a pair of optically transmissive elements juxtaposed with one another and each having a pair of oppositely directed planar parallel faces and said heater wire is located between a pair of said faces of said optically transmissive elements.

3. A window assembly according to claim 1, wherein said heater wire is arranged in a serpentine pattern.

4. A window assembly according to claim 1, wherein said dimension of said heater wire is less than 0.13 mm (0.005 inch).

5. A window assembly according to claim 1, wherein said dimension of said heater wire is less than 50% of a minimum permissible width of an indicia in a barcode.

6. A window assembly according to claim 1, wherein said dimension of said heater wire is less than 20% of a minimum permissible width of an indicia in a barcode.

7. A window assembly according to claim 1, wherein said window assembly has a spectral transmission of 1% maximum for wavelengths between 450 nm and 575 nm, 10% maximum for wavelengths between 576 nm and 600 nm, 50% for a wavelength of 625 nm and 88% minimum for wavelengths between 670 nm and 700 nm.

8. An optical scanning device comprising:
   a) a housing; and
   b) a window assembly according to claim 1 to transmit a beam between an interior of said housing and a barcode formed from a plurality of indicia and having
      a switch operable to connect said power source to said heater wire.

9. An optical scanning device according to claim 8 wherein said switch comprises a thermostat connected to said heater wire for maintaining a temperature of said heating wire above a predetermined value.

10. A window assembly according to claim 1, wherein said heating wire has a dimension measured in the plane of said light transmitting panel parallel to said panels, less than the width of a minimum permissible indicia in a barcode.

11. A window assembly according to claim 1, wherein said heating wire is embedded between said panels.

12. A method of forming a window assembly for a scanner, the window assembly comprising:
   a light transmitting panel having a pair of oppositely directed panels parallel to one another to receive and transmit a scanning beam, said pair of oppositely directed planar surfaces being bonded together using an adhesive, and
   a positive temperature coefficient heater wire in contact with said panel, said positive temperature coefficient heater wire being arranged between said panels and having terminal portions for connection to a power source,
   the method comprising:
      determining a thickness of the panel in dependence upon the material of the panels, an ambient temperature range based on the positive temperature coefficient heater wire, and an input power of the power source, so that a temperature of the heater wire is below a boiling point of the adhesive and a temperature of the panel is above a minimum dewpoint temperature.

* * * * *

UNITED STATES PATENT AND TRADEMARK OFFICE
CERTIFICATE OF CORRECTION

PATENT NO. : 7,798,411 B2  
APPLICATION NO. : 11/447888  
DATED : September 21, 2010  
INVENTOR(S) : Gagne et al.

It is certified that error appears in the above-identified patent and that said Letters Patent is hereby corrected as shown below:

In the Specifications:

In Column 1, Line 26, delete "beam," and insert -- beam. --, therefor.

In the Claims:

In Column 7, Line 48, in Claim 1, delete "panel" and insert -- panel, --, therefor.

Signed and Sealed this  
Thirtieth Day of April, 2013

Teresa Stanek Rea  
*Acting Director of the United States Patent and Trademark Office*